United States Patent [19]
McGahren et al.

[11] 3,772,151
[45] Nov. 13, 1973

[54] PREPARATION OF 2-CHLORO-7-HYDROXY-11-(4-METHYL-1-PIPERAZINYL)- DI BENZ(B,F)-OXAZEPINE

[75] Inventors: William James McGahren, Demarest; Martin Paul Kunstmann, Pearl River, both of N.Y.

[73] Assignee: American Cyanamid Company, Stamford, Conn.

[22] Filed: Sept. 29, 1972

[21] Appl. No.: 293,711

[52] U.S. Cl.............................................. 195/51 R
[51] Int. Cl........................................... C12d 13/00
[58] Field of Search .................................. 195/51 R

[56] References Cited
UNITED STATES PATENTS
3,317,401   5/1967   Nielson et al. .................... 195/51 R
3,453,179   7/1969   Greenspan et al. ................ 195/51 R

*Primary Examiner*—Alvin E. Tanenholtz
*Attorney*—Ernest Y. Miller

[57] ABSTRACT

A method for converting 2-chloro-11-(4-methyl-1-piperazinyl)dibenz[b,f][1,4]oxazepine to 2-chloro-7-hydroxy-11-(4-methyl-1-piperazinyl)dibenz[b,f][1,4]oxazepine through fermentative biosynthesis employing the organism *Cunninghamella elegans*. The compound is physiologically active as a tranquilizer and antidepressant.

4 Claims, No Drawings

PREPARATION OF 2-CHLORO-7-HYDROXY-11-(4-METHYL-1-PIPERAZINYL)- DI BENZ(B,F)-OXAZEPINE

PRIOR ART

A method for the preparation of 2-chloro-11-(4-methyl-1-piperazinyl)dibenz[b,f][1,4]oxazepine is described and claimed in U. S. Pat. No. 3,444,169. This compound is also described and claimed in a method for the control of fertility in warm-blooded female animals in U. S. Pat. No. 3,412,193.

The product resulting from the present fermentation, 2-chloro-7-hydroxy-11-(4-methyl-1-piperazinyl)dibenz[b,f][1,4]-oxazepine, is specifically described and claimed in U. S. Pat. No. 3,660,406.

DESCRIPTION OF THE INVENTION

The compound 2-chloro-11-(4-methyl-1-piperazinyl)dibenz[b,f][1,4]oxazepine (I) is converted to 2-chloro-7-hydroxy-11-(4-methyl-1-piperazinyl)-dibenz[b,f][1,4]oxazepine (II), a highly effective psychoactive agent in an aerobic fermentation procedure employing the microorganism *Cunninghamella elegans* (ATCC 9245). The reaction which takes place can be illustrated as follows:

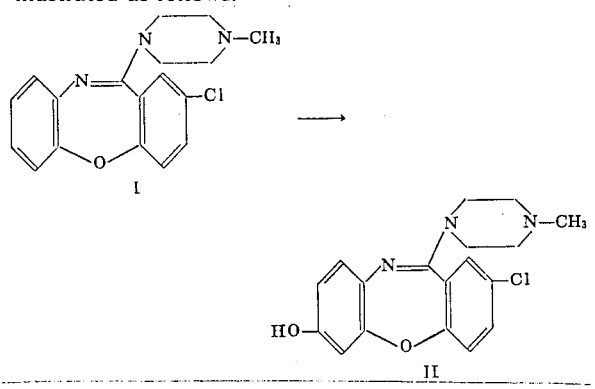

This microbiological method represents an improvement over the chemical conversion process for preparing compound (II) in that the chemical conversion is a multistep process with a comparatively low overall yield.

It was found that all of the cultures screened, which amounted to a total of 60, including eight strains of *Cunninghamella elegans*, only ATCC 9245 was capable of conducting the subject transformation.

FERMENTATION PROCESS

Cultivation of the organism *Cunninghamella elegans* ATCC 9245 obtained from the American Type Culture Collection may be carried out in a wide variety of liquid culture media. Useful media may include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate chloride, etc. Trace elements such as boron, molybdenum, copper, etc.; are usually supplied as impurities of other constituents of the media. Aeration in tanks or bottles is provided by forcing sterile air through or onto the surface of the fermenting medium. Further agitation in tanks is provided by a mechanical impeller. An antifoaming agent such as lard oil may be added as needed.

INOCULUM PREPARATION

Flask inoculum of *Cunninghamella elegans* (ATCC 9245) is prepared by inoculating 50 ml. of sterile liquid medium in 250 ml. flasks with scrapings or washings of spores from an agar slant of the culture. The following is an example of a suitable medium:
Corn steep liquid —2%
Glucose —4%
$(NH_4)_2SO_4$ —1%
$KH_2PO_4$ —0.6%
$CaCO_3$ —0.5%
Water to —100%
pH adjusted to 6.2

The flasks are incubated at 20° C. on a rotary shaker for 72 hours.

FERMENTATION PROCEDURE

Aliquots of about 5 ml. of the above described inoculum are then used to inoculate flasks containing sterile fermentation medium. A suitable medium is exemplified below:
Corn steep liquor —2%
Glucose —2%
$(NH_4)_2SO_4$ —1%
$Na_2HPO_4$ —0.6%
$CaCO_3$ —0.5%
Water to —100%
pH adjusted to 6.2

The flasks are incubated for 24 hours at which time 2-chloro-11-(4-methyl-1-piperazinyl)dibenz[b,f][1,-4]oxazepine in methanol is added to the fermentation flask at an approximate concentration of 200 mg. per liter of medium. The fermentation is continued for an additional 60–120 hours.

ISOLATION PROCEDURE

The pH of the harvest mash is adjusted to 7.0 and extracted with an equal volume of n-butanol. The butanol extract is concentrated to a gummy residue. This residue is passed through acid washed diatomaceous earth using the system hexane:- ethyl acetate:methanol:water (70:30:15:6). Appropriate fractions from the partition column are combined and concentrated to an oil suspension which upon trituration with ether leaves a gray residue. Further trituration of this residue with ether produces an off-white solid which is dissolved in methanol and applied to a Brinkmann 2 mm. thick layer plate and developed using the system chloroform:methanol 8:2. The more polar band is eluted batchwise to give a residue which is again triturated with ether yielding 2-chloro-7-hydroxy-11-(4-methyl-1-piperazinyl)-dibenz[b,f][1,4]oxazepine as a white solid.

SPECIFIC DISCLOSURE

The present invention is further described by the following specific examples:

EXAMPLE 1

Shaker Flask Transformation of I to II Using (ATCC 9245)

Two 250 ml. Erlenmyer flasks each containing 50 ml. of the following sterile medium:
Corn steep liquor —2%
Glucose —4%
$(NH_4)_2SO_4$ —1%
$NH_2PO_4$ —0.6%
$CaCO_3$ —0.5%

Water to —100%
are adjusted to pH 6.2 and inoculated with spores from an agar slant of *Cunninghamella elegans* (ATCC 9245). These flasks are incubated at 20° C. for 72 hours on a rotary shaker. Between 3 and 5 ml. of this inoculum is then added to each of 22 Erlenmyer flasks each containing 50 ml. of the following sterile medium:

Corn steep liquor —2%
Glucose —2%
$(NH_4)_2SO_4$ —1%
$Na_2HPO_4$ —0.6%
$CaCO_3$ —0.5%
Water to —100%

The pH is adjusted to 6.2 and incubation is continued for 24 hours. At this time 10 mg. of 2-chloro-11-(4-methyl-1-piperazinyl)dibenz[b,f][1,4]oxazepine in 0.1 ml. of methanol is added to each flask. Fermentation is continued under the same conditions. The flasks are harvested 64 hours after substrate addition. The mashes are combined and the pH is adjusted to 7.0. The mash is extracted with an equal volume of n-butanol. The butanol is concentrated to a gummy residue of 560 mg. which is passed through 75 gm. of acid washed diatomaceous earth using the system hexane:ethyl acetate:methanol:-water (70:30:15:6). The volume of each of the first 21 fractions is 30–35 ml. and the remaining fractions are in the range 60–65 ml. Fractions 25 through 37 are combined and concentrated to 250 mg. of oily suspension, which upon trituration with ether gives 150 mg. of gray residue. The 140 mg. is again triturated with ether and the residue provides 60 mg. of off-white solid. This solid is dissolved in a small amount of methanol and applied to a Brinkmann 2 mm. thick layer plate and developed using chloroform:methanol (8:2). The more polar band of the two main bands is eluted batchwise yielding 30 mg. of a residue which is again triturated with ether leaving 12 mg. of white solid. The infrared spectrum of this product is identical with that of authentic 2-chloro-7-hydroxy-11-(4-methyl-1-piperazinyl)-dibenz[b,f][1,4]oxazepine.

EXAMPLE 2

Tank Transformation of I to II Using (ATCC 9245)

A slant of *Cunninghamella elegans* (ATCC 9245) is used to inoculate 50 ml. of the inoculum medium described in Example I. The medium is incubated at 20° C. for 72 hours on a rotary shaker. Approximately 5 ml. aliquots of this inoculum are added to each of four 250 ml. Erlenmyer flasks containing 50 ml. each of the same inoculum medium. After 48 hours of growth these 4 flasks are used to inoculate 2 liters of the same inoculum medium in an air-agitated bottle. This medium is incubated for 48 hours, The contents of the bottle are added to a 30 liter tank containing 20 liters of the fermentation medium described in Example 1. After 24 hours of tank growth 5.0 gm. of 2-chloro-11-(4-methyl-1-piperazinyl)dibenz[b,f][1,4]oxazepine in 35 ml. of methanol is added to the tank. The tank is harvested 70 hours after substrate addition. The mash is adjusted to pH 7.0 and extracted with 1/2 of its volume of n-butanol. Concentration of the n-butanol extract yields 30 gm. of crude black oil. Trituration of this oil with ether gives 21 gm. of a gummy solid which is taken up in 100 ml. of methanol and then concentrated to about 50 ml. The addition of 250 ml. of ether to this methanolic solution gives a gummy precipitate which is washed with ether and dried to yield 16 gm. This material is passed through 600 gm. of acid washed diatomaceous earth using the system hexane:ethyl acetate:methanol:water (60:40:20:6). Fractions 66 through 126, having an average fraction volume of 80–85 ml., are combined to yield 2.0 gm. of brown oil which is dried over phosphorus pentoxide for 16 hours to yield 1.7 gm. Trituration of this material with ether yields 1.1 gm. of light brown solid which by ultraviolet analysis is 62% 2-chloro-7-hydroxy-11-(4-methyl-1-piperazinyl)-dibenz[b,f][1,4]oxazepine.

EXAMPLE 3

Tank Transformation of I TO II Using (ATCC 9245)

The procedure of Example II is repeated. The mash is harvested 29 hours after substrate addition and the pH is adjusted to 7.0. Extraction of the mash with 1/2 its volume of n-butanol and concentration of the n-butanol gives an oil which is partitioned between methanol and heptane. Concentration of the methanolic phase gives 15 gm. of a gum which is chromatographed over 600 gm. of acid washed diatomaceous earth using the system hexane:ethyl acetate:methanol:water (60:40:15:6). Combination of fractions 67 to 130, average fraction volume 80–85 ml. gives 3.5 gm. of an oil which is refrigerated overnight and then triturated with ether to yield 2.2 gm. of light brown solid which is about 76% pure with regard to the desired derivative. A 60 mg. portion of this material is dissolved in 0.3 ml. of methanol and applied to a Brinkmann 2.0 mm. silica gel thick layer plate and developed using chloroform:methanol (8:2). The more polar main band is scraped off and eluted in a column with 20 ml. of 50:50 chloroform-methanol solution to obtain 30 mg. of faintly yellow solid. Upon trituration of this solid with ether 11 mg. of off-white material is obtained which by infrared analysis is identical with 2-chloro-7-hydroxy-11-(4-methyl-1-piperazinyl)dibenz[b,f][1,4]oxazepine.

We claim:

1. A method of preparing 2-chloro-7-hydroxy-11-(4-methyl-1-piperazinyl)dibenz[b,f][1,4]oxazepine which comprises subjecting 2-chloro-11-(4-methyl-1-piperazinyl)dibenz[b,f][1,4]-oxazepine to fermentation in an aqueous nutrient medium containing assimilable sources of carbohydrate, nitrogen and inorganic salts, under aerobic conditions, in the presence of *Cunninghamella elegans* ATCC 9245.

2. A method in accordance with claim 1 in which the product is recovered by extraction with a solvent and partition chromatography.

3. A method in accordance with claim 1 in which the product is extracted from the fermentation mash with n-butanol and purified by partition chromatography.

4. A method which comprises cultivating *Cunninghamella elegans* ATCC 9245 in an aqueous nutrient medium containing assimilable sources of carbohydrate, nitrogen and inorganic salts under aerobic conditions for about 24 hours, adding 2-chloro-11-(4-methyl-1-piperazinyl)dibenz[b,f][1,4]oxazepine, continuing the fermentation for a period of from about 60 to 120 hours and recovering the corresponding 7-hydroxy oxazepine therefrom.

* * * * *